(No Model.)
J. F. PACKER.
CULTIVATOR.
No. 382,184. Patented May 1, 1888.
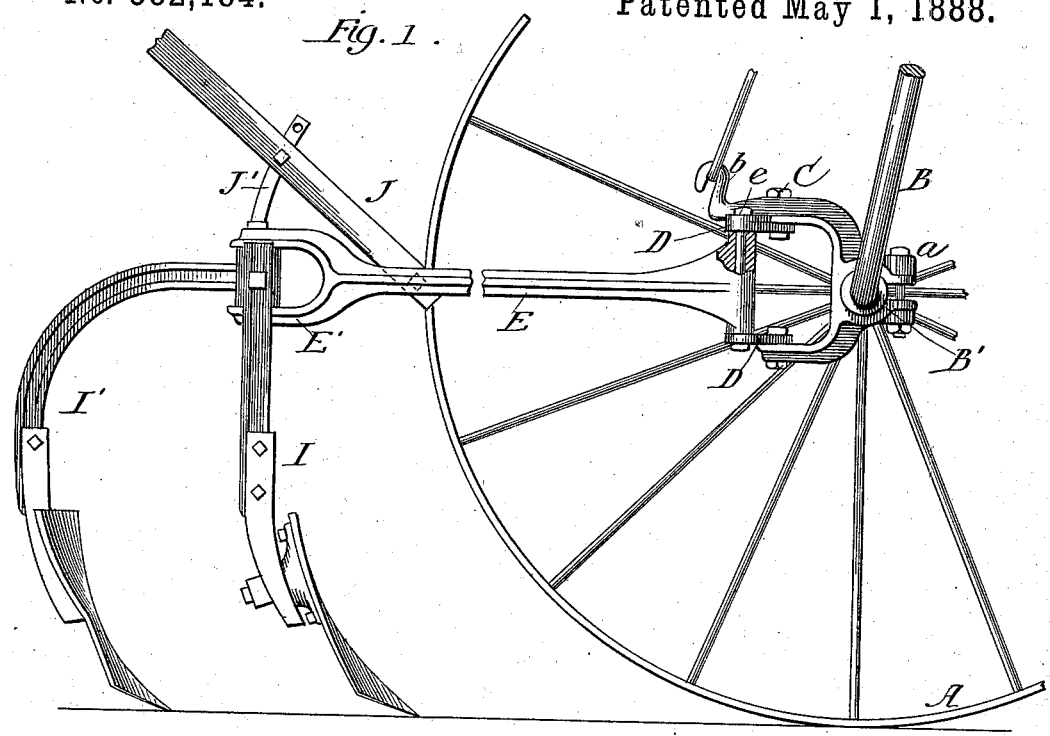
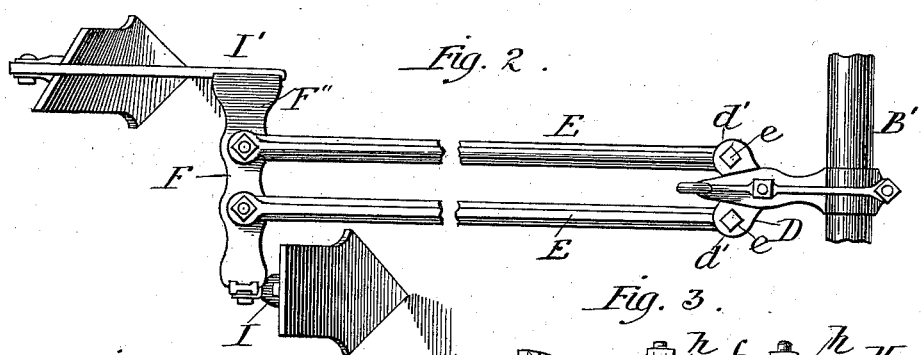
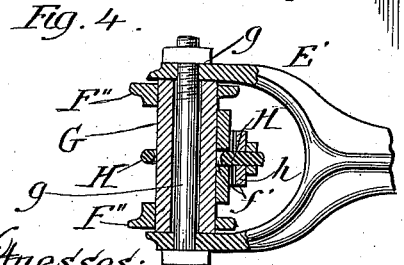
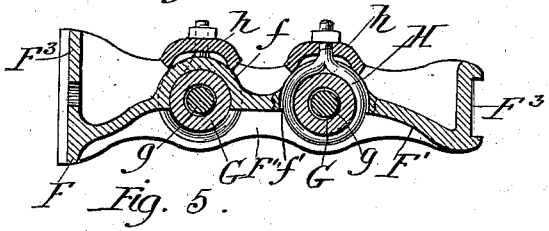
Witnesses:
Albert H. Adams.
Harry T. Jones.
Inventor:
John F. Packer.

UNITED STATES PATENT OFFICE.

JOHN F. PACKER, OF CHICAGO, ILLINOIS, ASSIGNOR TO THE DAVID BRADLEY MANUFACTURING COMPANY, OF SAME PLACE.

CULTIVATOR.

SPECIFICATION forming part of Letters Patent No. 382,184, dated May 1, 1888.

Application filed August 20, 1887. Serial No. 247,479. (No model.)

*To all whom it may concern:*

Be it known that I, JOHN F. PACKER, residing at Chicago, in the county of Cook and State of Illinois, and a citizen of the United States, have invented a new and useful Improvement in Cultivators, of which the following is a specification, reference being had to the accompanying drawings, in which—

Figure 1 is an elevation showing one beam of a straddle-row cultivator and its connections; Fig. 2, a plan view of a single beam and its attachment; Fig. 3, an enlarged detail, being a cross-section of the cross-head; Fig. 4, a detail, being a vertical section through the cross-head and coupling; Fig. 5, a detail showing the attaching-plate.

This invention relates to that class of wheel-cultivators having a double beam by which the shovels are carried on a cross head, and has for its objects to improve the construction and operation of the cross-head and the attachment thereof to the beam, to improve the means for connecting the beam to the axle-coupling, and to improve, generally, the working qualities of the beam; and its nature consists in the several parts and combination of parts hereinafter described and claimed as new.

In the drawings, A represents the wheels, one only being shown.

B is the arch, having a top portion and end standards with axle-spindles, as usual.

B' is the pipe-box, mounted on the spindle, as usual.

C is the coupling, clamped to the pipe-box B' by a bolt, $a$, or otherwise, and having, as shown, the upper arm of the fork provided with a hook, $b$, for the attachment of any common or well-known form of lifting-spring. (Not shown.)

D represents the attaching-plates for the double beam, one being firmly secured to each arm of the fork of the coupling C by a bolt passing through a hole, $d$, and each plate D is provided with a hole, $d'$, in each of the other corners, which holes are equally distant from the hole $d$.

E is the beam, formed of two bars, each pivotally attached to the plates D by a bolt, $e$, passing through the holes $d'$ of the two plates D and the forward end of each bar E, as shown in Figs. 1 and 2. Each bar E is provided with a fork, E', at its rear end, as shown in Figs. 1 and 4.

F is the cross-head, cast or formed in a single piece, having top and bottom plates F'' a central wall, F', and end walls, F³. The central wall, F', runs the entire length of the cross head and is provided with two semicircular portions, $f$, whose centers are the same distance apart as the centers of the holes $d'$ of the plate D, and these semicircular portions $f$ are provided with a cross slot or opening, $f'$, about midway of their length. Each end wall, F³, is adapted for the attachment of the standards of the cultivator-shovels.

G represents sleeves or collars which fit into the semicircular portions $f$ of the cross-head F, and are a little longer than the depth of the cross-head F, so as to project a little above and below the plates F'' of the cross-head F, as shown in Fig. 4. Each sleeve or collar G is secured in place by a bolt, $g$, which also passes through the fork E', pivoting the bars of the beam E to the cross-head F.

H are eyebolts, one encircling each collar or sleeve G and having its stem passed through the slot $f'$ of the semicircular portion $f$ of the wall F. A clamp, $h$, is placed on the stem of each eyebolt H, which clamp draws against the opposite side of the wall F from the sleeve G when the nut of the eyebolt is set down and prevents the sleeve from turning in use.

I I' are the front and rear shovels, attached to the end walls, F³, of the cross head, as shown in Figs. 1 and 2.

J is the handle, attached to the beam and braced, as shown, by a rod, J', from the cross-head F.

The parts are assembled by putting the eyebolts H in the semicircle $f$, with the stem passing through the slot, and then sliding the sleeve or collar G into the semicircle $f$ and through the eye of the bolt H and clamping it in that position, so as to be non-rotating, as shown in Fig. 3. Each bar of the beam E is then attached by a bolt passing through the fork E' and collar G, drawing the fork against the ends of the collar, and each bar of the beam E is attached at the front end by a bolt, $e$, passing through the holes $d'$ of the plates and the front end of the bar, pivotally connecting the beam as a whole to the coupling C, to which the plates D are attached.

In use the beam is raised and lowered, as usual, by the turning of the pipe-box on the axle-spindle with the aid of a lifting-spring, if so desired. The lateral swing of the beam is on the pivots $e\ e$ and $g\ g$, and as the pivots are equally distant apart the cross-head F is kept parallel to a line through the holes $d'\ d'$, and consequently parallel to the axle of the cultivator, thus maintaining the shovels in the proper line of travel and in position for the best results in use. The sleeves or collars G, projecting above and below the cross-head, take all the friction and wear directly on their ends, instead of on the cross-head, and such wear can be readily taken up by setting down the nuts of the bolts, and in case of too much wear or breakage repairs can be easily and cheaply made by replacing the sleeve by a new one.

The arrangement of the cross-head F, the bars of the beam E, and the attaching-plates D is one that will always keep the cross-head parallel to the axle, and yet permit of a free lateral swing. The cross-head is very light and simple in its construction, and at the same time furnishes an effective and firm support for the shovels and attachment of the beam.

What I claim as new, and desire to secure by Letters Patent, is—

1. The cross-head F, having two semicircular portions, $f$, for the reception of attaching-sleeves, substantially as and for the purpose specified.

2. The cross-head F, having two semicircular portions, $f$, in combination with the sleeve or collar G, for attaching a cultivator-beam and receiving the wear, substantially as specified.

3. The cross-head F, having two semicircular portions, $f$, with slot $f'$, in combination with the sleeves G and clamping-eyebolts H, for locking the sleeves against movement, substantially as and for the purpose specified.

4. The cross-head F, having two semicircular portions, $f$, and plates D, in combination with a plow-beam for maintaining the alignment of the cross-head and a straight run for the shovels, substantially as specified.

5. The combination of the coupling C, having two arms forming a fork, the attaching-plates D, one being secured to each arm of the fork and provided with holes $d'$, and the beam E, formed of two bars pivotally attached to the plates D by a bolt, $e$, passing through holes $d'$ of the plates D, as described, for the purposes specified.

JOHN F. PACKER.

Witnesses:
ALBERT H. ADAMS,
HARRY T. JONES.